Figure 1:
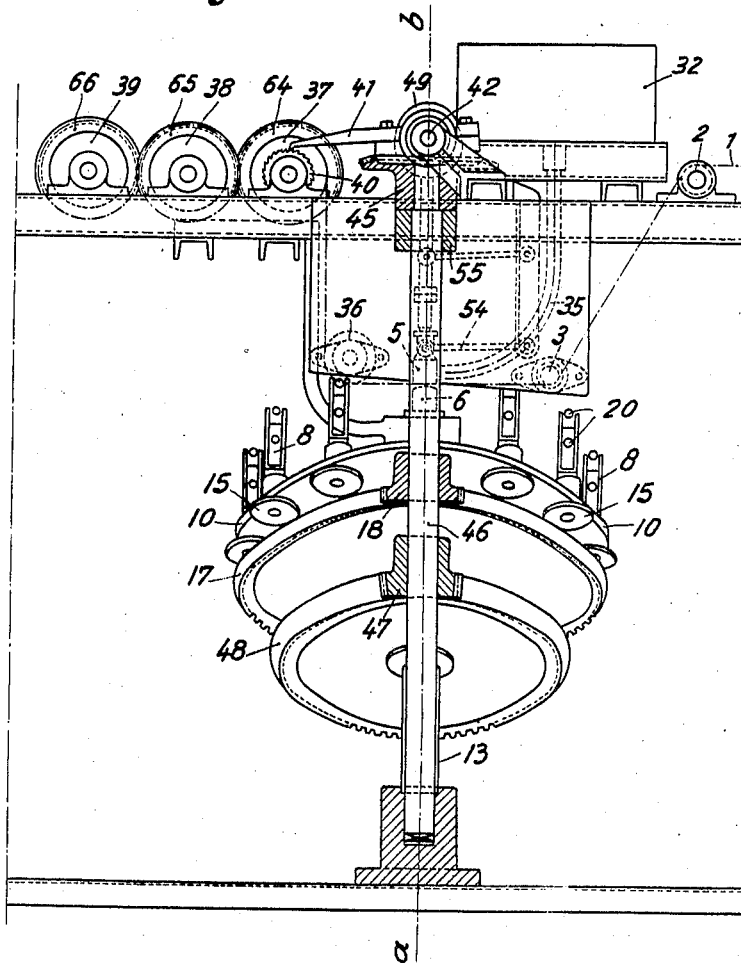

Feb. 16, 1937. W. KRÄMER 2,071,210
MANUFACTURE OF WIRE NETTING
Filed Jan. 9, 1936 4 Sheets-Sheet 1

Inventor
WILHELM KRÄMER
by Walter S. Bleistein
ATTORNEY

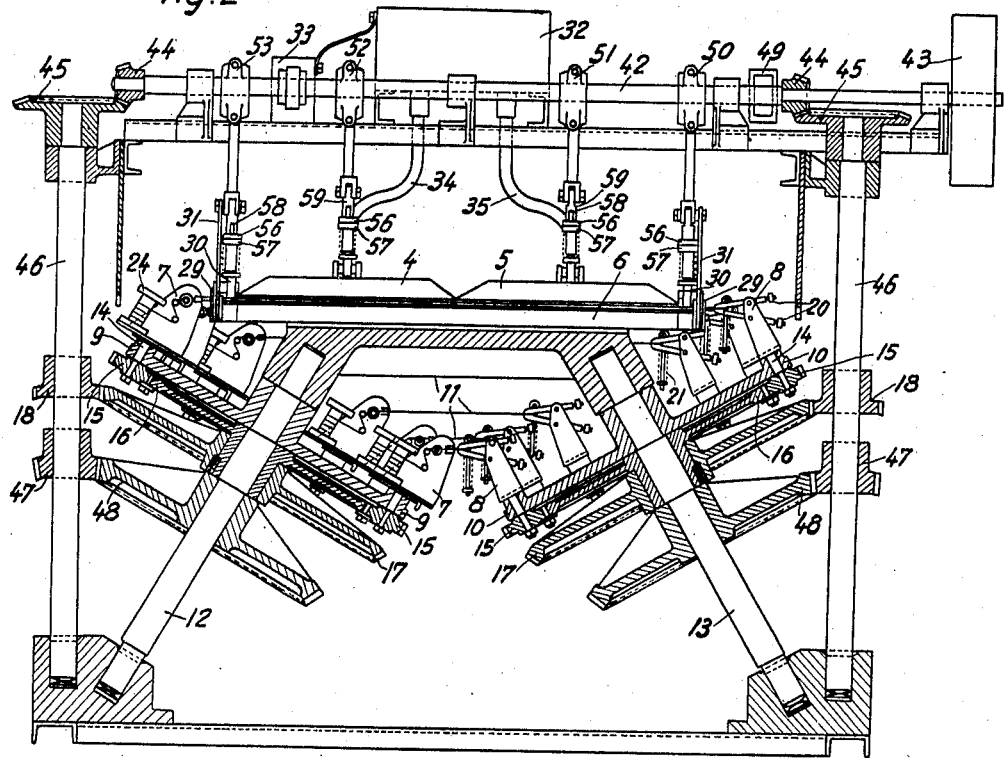

Feb. 16, 1937.  W. KRÄMER  2,071,210
MANUFACTURE OF WIRE NETTING
Filed Jan. 9, 1936   4 Sheets-Sheet 3

Inventor
WILHELM KRÄMER
by Walter S. Bleistein
ATTORNEY

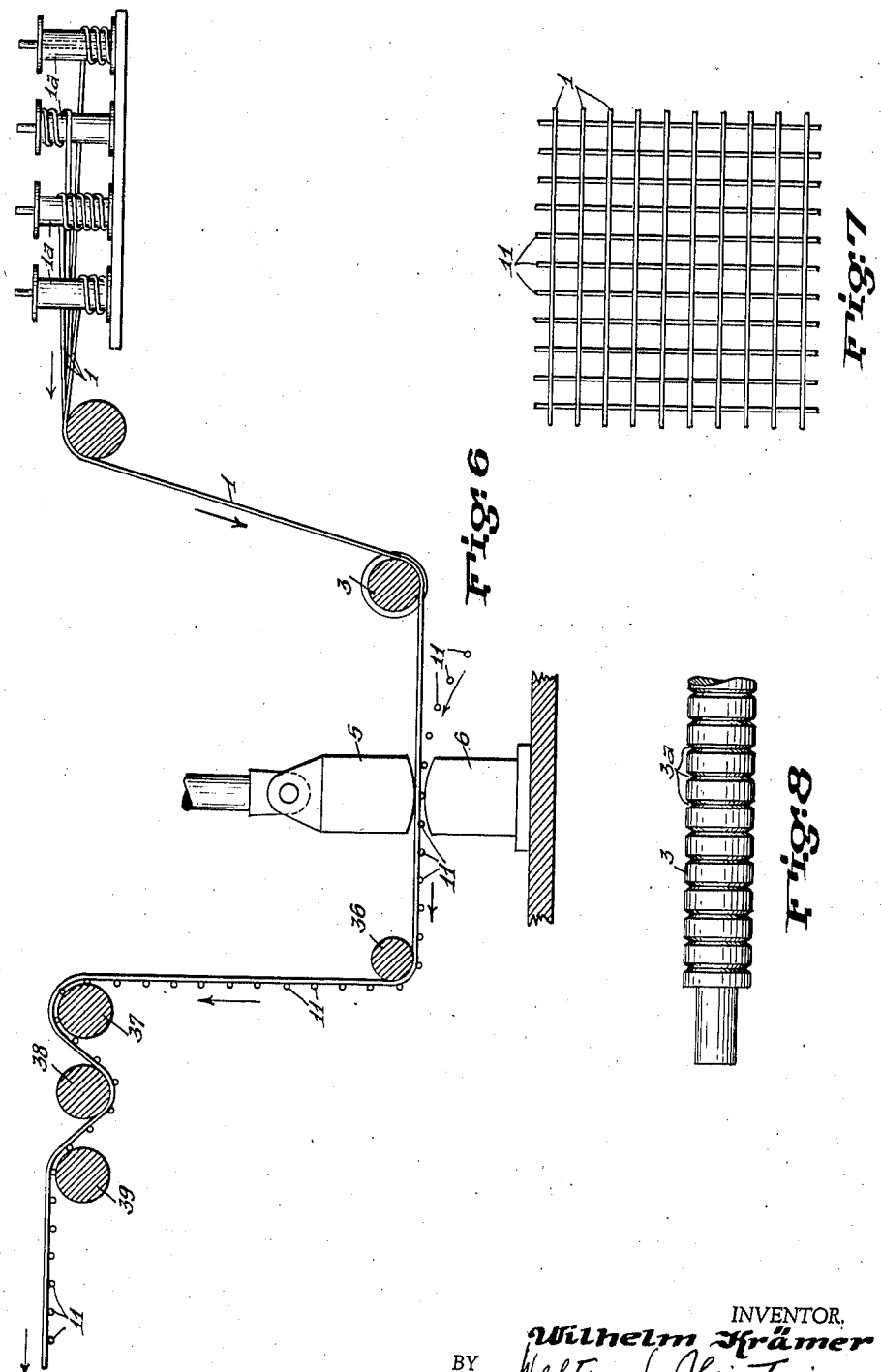

Patented Feb. 16, 1937

2,071,210

UNITED STATES PATENT OFFICE 2,071,210

MANUFACTURE OF WIRE NETTING

Wilhelm Krämer, Emmerich, Germany

Application January 9, 1936, Serial No. 58,386
In Germany October 9, 1933

18 Claims. (Cl. 140—112)

Wire netting the wires of which are very thin in relation to the width of the mesh cannot be made by the known weaving or entwining processes because the several wires no longer give a mutual hold on account of their too great distances apart and insufficient resistance to bending, so that the wire netting collapses. It is therefore necessary to weld the longitudinal and transverse wires together at their crossings.

If welded wire netting composed of thin wires with large mesh widths has not yet been used to a great extent, that is because most of the known machines for making such wire netting work according to methods for the carrying out of which large machines are required which take up much room, are complicated in their details, and are therefore very costly.

In the case of these known machines, for the formation of the netting to be welded, the transverse wires are supplied by special bobbin frames either from the side, in which case the lateral supplying device requires a considerable erection space laterally of the machine proper, or they are placed on the stretched longitudinal wires from above by means of supplying members moved to and fro over the machine.

In the case of both methods the devices for supplying the transverse wires require at the place of supply space extending over the stretched longitudinal wires to such an extent that there is no space left free at that place for the provision of the welding electrodes. Therefore the entire welding arrangement must be provided at another part of the machine and the length of the machine is thus again considerably increased.

These disadvantages are obviated by the method according to the invention, which consists essentially in that the transverse wires are drawn off a wire-bobbin by means of one or more wire-grippers in such a manner that at the beginning of the drawing off the wire-bobbin and the wire-gripper are approximately in a plane extending at right angles to the plane of the netting to be made through the middle axis thereof and then on the drawing off of the transverse wire by in each case a length that corresponds approximately to half the width of the network to be made, move alternately towards one edge of the netting and the other. The transverse wires advantageously are cut off at both ends after the drawing off of the necessary length of wire. According to the invention it is possible to move the wire-bobbin and the wire-gripper in opposite directions towards the edges of the netting during the drawing off of the transverse wire.

In this way there results for the machine working according to the method of the invention a simple construction without great requirement of space and a low cost of manufacture. The machine may further be so constructed that the wire-bobbin carriers and wire-gripper carriers for the transverse wires rotate uninterruptedly whilst the longitudinal wires are fed intermittently. In the case of this constructional form there is no danger that the longitudinal wire may be stretched by its uninterrupted movement during the welding operation and that consequently the wire, softened by the welding heat, may break with arc formation.

According to the invention, the wire-bobbin carriers and the wire-gripper carriers for the transverse wires may be made of disc shape and their planes may be located symmetrically to the longitudinal axis of the wire netting to be made and be inclined to the surface of the wire netting in such a manner that they leave free between them and the wire netting space for the provision of a welding electrode advantageously made in the form of a strip or a contact plate as an abutment for the welding electrodes.

According to the invention it is further possible to arrange the wire-bobbin holders and the wire-grippers rotatably on their disc-shaped carriers and also to hold the wire-bobbin holders in the wire-bobbin carriers by spring pressure and to make them easily exchangeable. Furthermore, the welding electrodes and their abutment may be arranged to be adjustable horizontally and vertically in relation to the apparatus for supplying the transverse wires and there may be arranged laterally to the welding electrodes stops which in combination with holding clamps secure the correct position of the transverse wire during welding.

Figure 5:
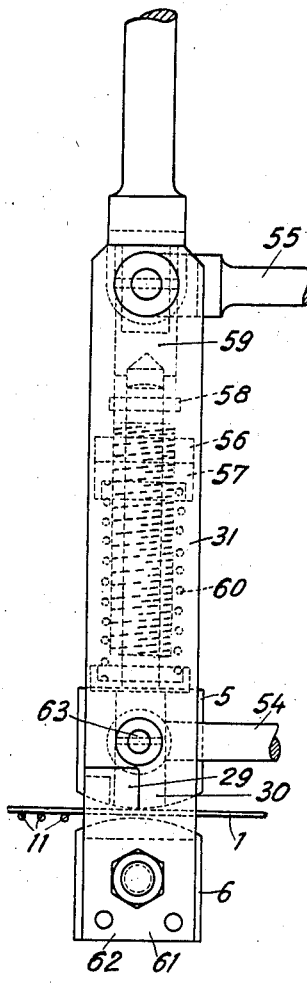
Figure 4:
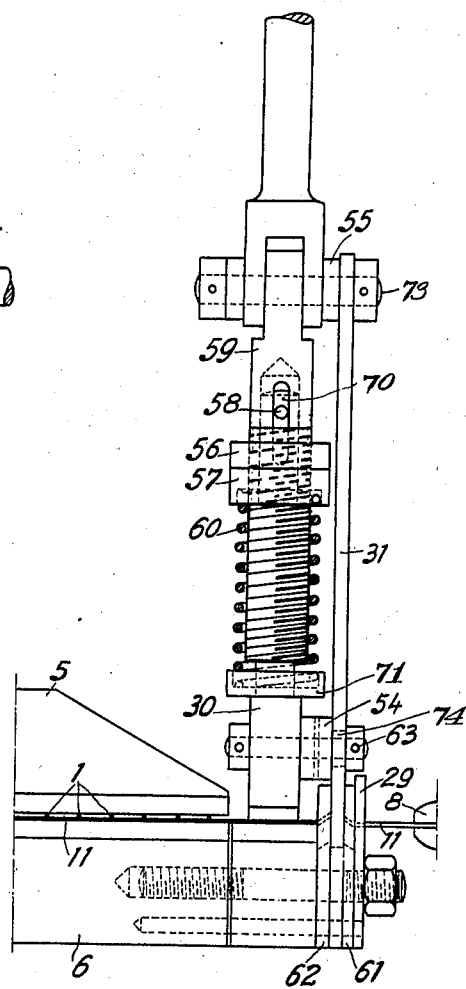

In the accompanying drawings there is represented an apparatus according to the invention:

Figure 1 shows a side view;

Figure 2 a section according to the line a—b of Figure 1;

Figure 3 a wire-bobbin holder and a wire-gripper shortly before the grasping of a transverse wire by the gripper;

Figures 4 and 5 front and side views respectively of the parts for grasping and cutting the transverse wires;

Fig. 6 a schematic illustration of the manner in which the longitudinal wires and the finished netting are fed forward;

Fig. 7 a bottom view of a portion of the finished netting, and

Fig. 8 a view of a portion of a roller for guiding the longitudinal wires.

The longitudinal wires 1 are led in a known manner from reels 1a over rollers 2 and 3 between the welding electrodes 4 and 5 and the abutment contact plate 6 (Figures 1 and 2).

The wires 1 are fed forward by rollers 37 and 38 as will be explained later. Guiding roller 3 is grooved at 3a (see Fig. 8) in order to keep the wires at the desired distance corresponding to the width of the netting, and is so arranged that the wires run at a small distance above plate 6 when the electrodes 4 and 5 are raised. By means of the wire-bobbin holders 7 and the wire-grippers 8, which are mounted in the continuously rotating wire-bobbin carriers 9 and wire-gripper carriers 10 and are carried by them along the circumference of a circle, the transverse wires 11 are conducted from below or from above to the longitudinal wires 1. The schematic view of Fig. 6 clearly shows the way the transverse wires when fed from below travel in relation to the longitudinal wires 11.

The wire-bobbin carriers 9 and the wire-gripper carriers 10 rotate in planes inclined to each other, this being effected by the inclination of the shafts 12 and 13. The place at which a given wire-bobbin holder 7 on the wire-bobbin carrier 9 and the wire-gripper 8 on the wire-gripper carrier 10 that cooperates with it approach nearest to each other is in a horizontal plane other than the place of their greatest separation. The fastening bolts 14 are mounted rotatably in the wire-bobbin carrier 10 and are so rotated by means of the small rotating toothed wheels 15, which engage with the wheel 16, that the wire-bobbin carriers 7 and the wire-grippers 8 execute a revolution about their own axes during each revolution of the wire-bobbin carrier 9 and the wire-gripper carrier 10, and in fact in such a manner that the position of the wire-bobbin holders and wire-grippers always has the same direction in space. The bevel wheels 17 and 18 transmit to the spur wheels 16 the rotational velocity necessary for this purpose. From the place at which the wire-bobbin holders 7 and the wire-grippers 8 come nearest to one another, the wire-grippers are opened by means of two cam surfaces 19 (Figure 3) so that one end of the transverse wire 11 that is to be newly formed projects into the opening of the wire-gripper jaws. When the position of approach is reached, the cam surfaces 19 liberate the rollers 20, whereupon the tongs close under the action of the compression springs 21. The new transverse wire is now drawn out between a wire-gripper 8 and a wire-bobbin holder 7 quite automatically by the further movement of the wire-bobbin carriers 9 and the wire-gripper carriers 10. The wire-bobbin holders 7 have each a leather brake 22 and a nipple 23 for the braking and guiding of the transverse wire 11 running off the bobbin 24. The fastening bolts 14 of the wire-bobbin holder 7 are provided lengthwise with an axial hole. The holders 7 have downwardly extending pins 25 which fit in the holes of the rotatable fastening bolts 14 and serve the purpose of providing for the easy and quick exchange of the bobbins 24 with their wire-bobbin holders 7. The lever catches 26, which engage with their noses in corresponding recesses of the bent sheet metal pieces 27 connected with the fastening bolts 14 and are under the action of tension springs 28, serve for the correct positioning of the changed wire-bobbin carriers 7.

In the course of the movement of the carriers 9 and 10, each transverse wire grasped by the wire-gripper is drawn out to the desired extent, raised above the abutment contact plate 6, and shifted in between the latter and the longitudinal wires running off roller 3 towards the electrodes, until it impinges during the further movement against the stop 29 (Figures 4 and 5) fastened laterally to the abutment contact plate 6. Shortly afterwards the two holding clamps 30 press the transverse wire 11 against the prolongation of the abutment 6, whereupon the two shearing blades 31 separate the stretched transverse wire 11 from the wire-bobbin holder 7 and the wire-gripper 8. Over the transverse wire 11 thus clamped fast extend the longitudinal wires 1 between the welding electrodes 4 and 5 and the contact plate 6. The welding electrodes 4 and 5 are now pressed against the contact plate 6 and the primary circuit of the welding transformer 32 is closed by the switch 33. The secondary current flows from the transformer 32 through the conductor 34 into the electrode 4 and is distributed there over its entire width, whereupon it traverses the wire crossings clamped between the electrode 4 and the contact plate 6 and passes into the contact plate 6. From the contact plate 6 it passes through the wire crossings that are clamped between the electrode 5 and the contact plate 6 into the electrode 5 and from it through the return conductor 35 into the transformer 32. When the secondary current passes through the wire-crossings that are clamped fast, they are heated to welding temperature and welded, whereupon the electrodes 4 and 5 carried by the rods 54 and 55 and the holding clamps 30 are raised by means of the eccentrics 50, 51, 52, and 53 from the abutment contact plate 6 and its lateral prolongations in order to make room for the next transverse wire. Before the entry of the next transverse wire, the finished wire netting, which is led over the guide roller 36 to the feeding drums 37, 38, 39, is fed forward by a mesh length by means of the ratchet wheel 40 and the pawl 41, which is located on the eccentric 49, by means of the friction between the stretched wire-netting and the feeding drums 37, 38, and 39. By this means the longitudinal wires 1 running off roller 3 are also moved forward. The stepwise advancement of these wires occurs while the electrodes are in the raised position, and is completed before the subsequent welding takes place. Thus, after each welding operation, a free place is produced for a further transverse wire which, in the meantime, is placed between the electrodes against stops 29 by the constantly moving carriers 9 and 10, and then is welded to the longitudinal wires in the hereinbefore described manner. This process is repeated in the case of each transverse wire.

The completed netting has the shape as illustrated in Fig. 7. Equality of the mesh lengths is safeguarded by stops 29 against which the transverse wires abut before being welded, and equality of the mesh width by the spacing of the grooves 3a of roller 3.

The electrodes 4 and 5 may be united into a strip extending for the whole width of the netting. In this case the abutment contact plate 6 must be connected to the return conductor 35.

The described movements of the several parts are produced by means of the driving shaft 42, which is driven by means of the belt pulley 43.

The shaft 42 rotates with constant velocity, which must be suited to the wire material to be treated for the time being. The two shafts 12 and 13 are driven by the shaft 42 through the bevel wheels 44 and 45, the shafts 46 and the bevel wheels 48 and 47.

Almost all the moved masses of the machine work uninterruptedly; only the feeding of the wire netting takes place intermittently. During each revolution of the shaft 42 a transverse wire is welded to the longitudinal wires.

The feeding rollers 37, 38 and 39 are connected with one another by the toothed wheels 64, 65 and 66. From the feeding roller 39 the finished wire netting passes in a known manner to a winding-up roller.

The fixing of the times for the pressing up of the holding clamps 30 and the electrodes 4 and 5 may be effected in two ways, and, in fact, by turning the eccentrics 50 and 53 on the shaft 42 or by adjusting the nuts 56 and 57 on the threaded portions of the guides 59 (see Figs. 4 and 5). Each of the holding clamps 30 terminates upwardly in a bolt, which can slide in the guide 59 and in which is fastened pin 58 which projects outwardly through slots 70 of the guide 59 and may bear with both ends on the nut 56. A compression spring 60 is arranged between nut 57 and clamp 30. A guide arm 55 is linked to the upper portion of guide 59 by means of bolt 73, and another guide arm 54 is linked to clamp 30 by means of bolt 63. An upper shearing blade 31 is mounted on bolt 73, and guided by bolt 63 passing through slot 74 of blade 31.

Lower blades 61 and 62 are fastened to the prolongation of contact plate 6. In the topmost position of guide 59, pin 58 rests on nut 56. When, on a downward stroke, clamp 30 engages the abutment contact plate 6 or a transverse wire 11 on top of this plate, its movement is stopped, but an increasing pressure is exerted thereupon by means of the compression spring 60. Simultaneously pin 58 leaves nut 56 and finally takes the position of Fig. 4 in slot 70. In the meantime blade 31 travels downward together with guide 59 while slot 74 passes bolt 63 until blade 31 meets lower blades 61 and 62 severing wire 11.

When, in order to set the time for the action of clamps 30, nuts 56 and 57 are so adjusted that the stems of the clamps protruding from guides 59 are lengthened they impinge on the prolongation of the abutment 6 sooner during their downward movement.

For the purpose of adjusting with accuracy the timing of the shearing of the transverse wires, the upper shearing blades 31 may be adjusted in height so that they meet the lower blades 61 and 62 sooner or later at the shearing point in the middle of the blades.

The adjustment for different widths of netting is effected by shifting the electrodes 4 and 5 and the contact plate 6 in the direction towards the guiding roller 3. In this way the transverse wires are cut off and welded before the maximum outmost position of the wire-bobbin holders 7 and of the wire-grippers 8 is reached, so that narrower wire netting is produced.

I claim:

1. In a machine for making wire netting with longitudinal and transverse wires electrically welded at their crossings, a welding member, a bobbin for wire for the transverse wires, a wire-gripper, means for bringing the bobbin and wire-gripper together on opposite sides of a plane extending through the longitudinal centre line of the netting perpendicular to the latter, means for operating the gripper to grip the end of the wire on the bobbin, and means for moving the bobbin and the gripper towards opposite edges of the netting and also towards the plane of the netting so that the transverse wire is brought between the longitudinal wires and said welding member.

2. In a machine for making wire netting with longitudinal and transverse wires electrically welded at their crossings, a disk-shaped wire bobbin carrier for the transverse wires, a disk-shaped wire-gripper carrier, said carriers being symmetrically arranged on opposite sides of the longitudinal axis of the wire netting and having their planes inclined to the surface of the netting, and a welding member mounted between said carriers and the wire netting.

3. A machine as claimed in claim 2 in which a number of wire bobbin holders and wire-grippers are mounted rotatably on the disc-shaped carriers.

4. A machine as claimed in claim 2 in which the wire bobbin carrier is provided with a number of holders for bobbins, said holders being easily removable and spring means being provided for retaining them on the carrier.

5. A machine as claimed in claim 2 comprising welding means horizontally and vertically adjustable in relation to the disk-shaped wire-bobbin and wire-gripper carriers.

6. A machine as claimed in claim 2 comprising abutments and clamping means for holding the transverse wires in the correct position during welding.

7. A machine as claimed in claim 2 including intermittently driven friction feeding means for the wire netting.

8. In a method of making wire netting with longitudinal and transverse wires welded at their crossings, the steps which consist in arranging a set of longitudinal wires in a relation corresponding to the shape of the netting to be made, bringing a spooled wire near the longitudinal plane of symmetry of said set, gripping the free end of the spooled wire, moving said gripped end towards the one side and the spooled wire towards the other side of said set, thereby stretching a portion of said spooled wire across the longitudinal wires, bringing said stretched portion into engagement with said longitudinal wires, and welding the wire crossings.

9. In a method of making wire netting with longitudinal and transverse wires welded at their crossings, the steps which consist in bringing a spooled wire near a plane extending through the longitudinal center line of a set of longitudinal wires arranged in another plane preparatory to form the netting, and at right angles to said other plane, gripping the free end of the spooled wire, moving said gripped end towards the one side and the spooled wire towards the other side of said set thereby stretching a portion of said spooled wire across the longitudinal wires, bringing said stretched portion between said longitudinal wires and a welding means, and welding the wire crossings.

10. In a method of making wire netting with longitudinal and transverse wires welded at their crossings, the steps which consist in bringing a spooled wire near a plane extending through the longitudinal center line of a set of longitudinal wires arranged in another plane preparatory to form the netting, and at right angles to said other plane, gripping the free end of the spooled wire, moving said gripped end towards the one side and the spooled wire towards the other side of said set, thereby stretching a portion of said spooled wire across the longitudinal wires to form a transverse wire, bringing said transverse wire into engagement with said longitudinal wires, welding the wire crossings and cutting the transverse wire from the remainder of the spooled wire, bringing said remainder of the spooled wire back to its position near said first mentioned plane, and advancing said longitudinal wires a step corresponding to the length of a mesh of the netting.

11. A method as claimed in claim 10 in which said spooled wire is continuously moved on an endless path.

12. In a method of making wire netting with longitudinal and transverse wires welded at their crossings, the steps which consist in bringing a spooled wire near a plane extending through the longitudinal center line of a set of longitudinal wires arranged in another plane preparatory to form the netting, and at right angles to said other plane, and on a level differing from that of the plane of the longitudinal wires, gripping the free end of the spooled wire, moving said gripped end towards the one side and the spooled wire towards the other side of the netting thereby stretching a portion of said spooled wire across the longitudinal wires to form a transverse wire, simultaneously bringing said spooled wire and said gripped end thereof to the level of said longitudinal wire, welding the wire crossings when said transverse wire contacts said longitudinal wires, cutting the transverse wire from the remainder of the spooled wire, bringing said remainder of the spooled wire back to its position near said first mentioned plane, and advancing said longitudinal wires a step corresponding to the length of a mesh of the netting.

13. In a method of making wire netting with longitudinal and transverse wires welded at their crossings, the steps which consist in arranging a set of longitudinal wires in a relation corresponding to the shape of the netting to be made, bringing a spooled wire near the longitudinal plane of symmetry of said set, and on a level differing from that of said set, gripping the free end of the spooled wire, moving said gripped end towards the one side and the spooled wire towards the other side thereby stretching a portion of said spooled wire across the longitudinal wires to form a transverse wire, simultaneously bringing said spooled wire and said gripped end thereof to the level of said set at the sides thereof, welding the wire crossing when said transverse wire contacts said longitudinal wires, cutting said transverse wire near its gripped end and near the remainder of the spooled wire, bringing said remainder of the spooled wire back to its position near said first mentioned plane, and advancing said longitudinal wires a step corresponding to the length of a mesh of the netting.

14. In a machine for making wire netting with longitudinal and transverse wires electrically welded at their crossings, a welding member, a stepwise operated mechanism for feeding the longitudinal wires to said welding member, a constantly moving mechanism for stretching a transverse wire across the longitudinal wires at a level differing from that of the place of welding, and for bringing said transverse wire to the level of said longitudinal wires, said constantly moving mechanism including a travelling bobbin for the material of the transverse wires and a travelling wire-gripper adapted to grip the end of the wire of the bobbin, the travelling paths of said bobbin and of said gripper being arranged in planes which are inclined and symmetric to the longitudinal axis of the wire netting, and means for operating said welding member when a wire portion of said bobbin contacts the longitudinal wires near the welding member.

15. In a machine for making wire netting with longitudinal and transverse wires electrically welded at their crossings, a welding member, a stepwise operated mechanism for feeding the longitudinal wires to said welding member, a travelling bobbin for the material for the transverse wire, a travelling wire-gripper adapted to grip the free end of the wire of said bobbin, the travelling paths of said bobbin and of said gripper being arranged in planes which are inclined and symmetric to the longitudinal plane of symmetry of the netting to be made, each of said paths being endless and including a point near said plane of symmetry, and another point near one of the edges of the netting, driving means for synchronically moving said bobbin and said gripper in opposite directions, and means operatively connected with said driving means for operating said welding member when a wire portion stretched between said bobbin and said gripper contacts the longitudinal wires at the welding member.

16. In a machine for making wire netting with longitudinal and transverse wires electrically welded at their crossings, a welding member, a bobbin for the material of the transverse wires, a wire-gripper, means for operating said gripper to grip the end of the wire of the bobbin, supporting means for said bobbin, supporting means for said gripper, said supporting means defining, for said bobbin and said gripper respectively, endless paths being close to each other on opposite sides of the longitudinal plane of symmetry of the longitudinal wires, and on a level differing from that of the longitudinal wires, and being remote from each other on opposite sides of said welding member and substantially on the level of said plane of the longitudinal wires, and means for synchronically moving said bobbin and said gripper in opposite directions.

17. In a machine for making wire netting with longitudinal and transverse wires electrically welded at their crossings, a bobbin for the material of the transverse wires, a wire-gripper adapted to grip the end of the wire of the bobbin, a movable carrier for said bobbin, a movable carrier for said gripper, said carriers being symmetrically arranged on opposite sides of the longitudinal plane of symmetry of the wire netting to be made, and having planes of motion inclined to said plane of symmetry, a holder for said bobbin, said holder being mounted on said bobbin carrier and including guiding means for holding the wire leaving the bobbin opposite to the mouth of said gripper, and a welding member mounted between said carriers and the wire netting.

18. In a machine for making wire netting with longitudinal and transverse wires electrically welded at their crossings, a bobbin for the material of the transverse wires, a wire-gripper, a movable carrier for said bobbin, a movable carrier for said gripper, said carriers being symmetrically arranged on opposite sides of the longitudinal plane of symmetry of the wire netting and having planes of motion inclined to said plane of symmetry, a holder for said bobbin, said holder being mounted on said bobbin carrier and including guiding means for holding the wire leaving the bobbin opposite to the mouth of said gripper, a welding member, mounted between said carriers and the wire netting, automatic means for operating said gripper to grip the end of the wire of the bobbin when said bobbin and said gripper are close to each other, and means for cutting said wire of the bobbin near both ends of said welding member.

WILHELM KRÄMER.